Aug. 6, 1929.  A. J. SCHULTZ  1,723,893
PIPE EXTRACTOR
Filed Feb. 25, 1928
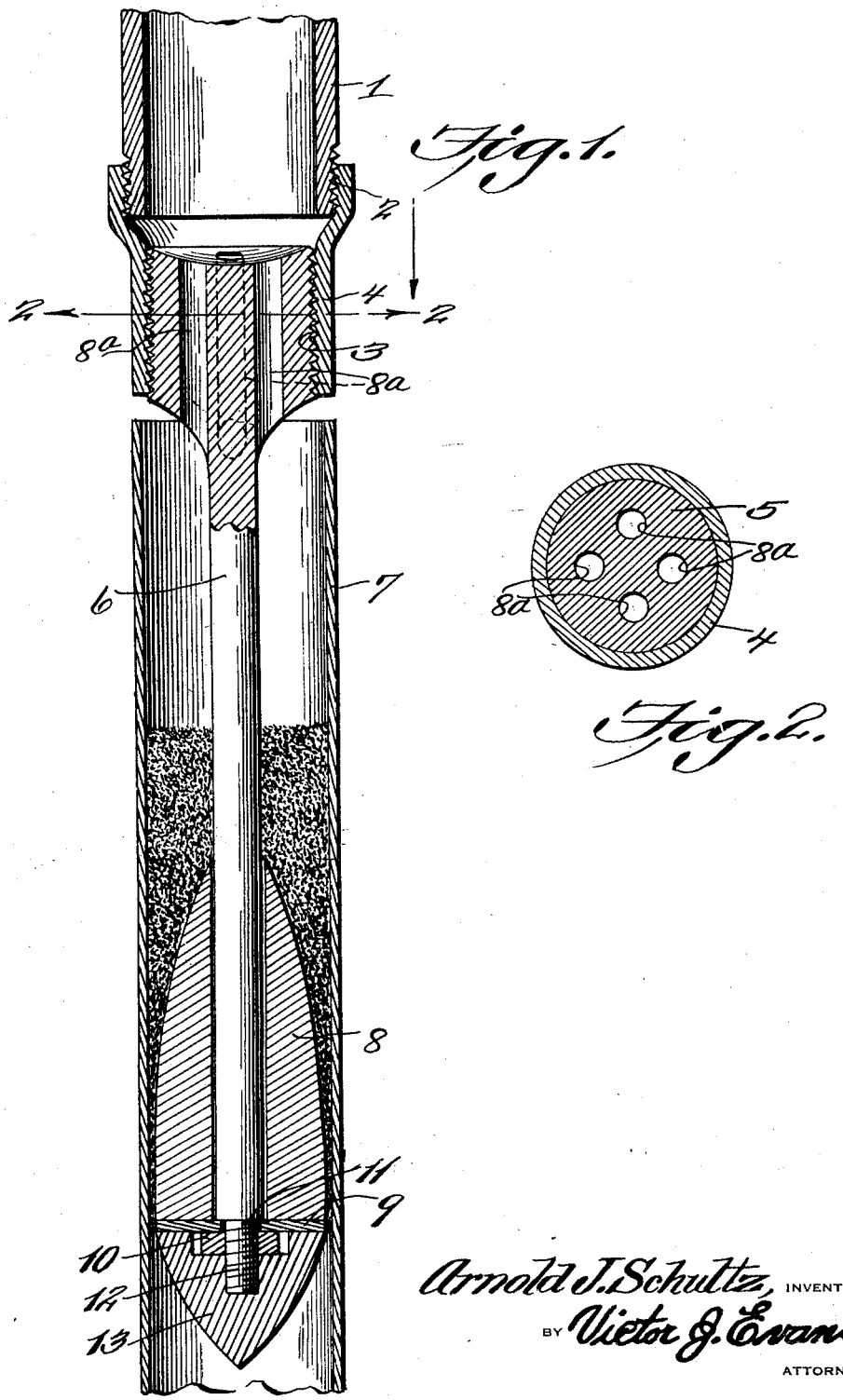
Arnold J. Schultz, INVENTOR
BY Victor J. Evans
ATTORNEY Patented Aug. 6, 1929.

1,723,893

UNITED STATES PATENT OFFICE.

ARNOLD J. SCHULTZ, OF BROOKLYN, NEW YORK.

PIPE EXTRACTOR.

Application filed February 25, 1928. Serial No. 257,058.

The present invention relates to an improved pipe extractor for extracting pipe sections from the ground and from wells, and an object of the invention is to provide an improved coupling between a drill stem and a pipe section, comprising a frustro conical fibre sleeve and a backing or deposit of sand and gravel, whereby the pipe section or pipe may be extracted, said sleeve to be carried by a metal rod, which has a coupling with the drill stem, whereby as the stem is lifted the pipe section may be extracted.

Another purpose is to provide a device of this kind which may be manufactured for a relatively low cost and sold at a reasonable profit.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view in section showing the improved extractor constructed in accordance with the invention.

Figure 2 is a cross sectional view on line 2—2 of Figure 1.

Referring to the drawings, 1 identifies a conventional type of drill stem which may be any length or any diameter with its lower end threaded at 2, which engages with the threads of the coupling sleeve 4, which is interiorly threaded at its lower end for engagement with the left hand threads 3 of the head 5 of a rod 6. The rod 6 merges or tapers into the head 5, which may be any length and any diameter, suitable to accommodate the sleeve or coupling 4.

The rod 6 may be lowered into a pipe section 7 for the purpose of removing the same, the rod to be any length and any diameter.

However, formed through the head 5 is a plurality of openings 8ª, which may extend from the upper surface of the head down to and terminating through the head adjacent the rod 6.

A frustro conical sleeve 8 loosely fits the rod 6 and is capable of sliding movement upon the rod, though it rests upon a washer 9.

This washer 9 engages against a shoulder 11 of the rod 6, there being a nut 10 threaded on the extension 12, which in turn is threaded into a frustro conical steel point 13, which is located below the washer 9.

In using and operating the pipe section extractor, the drill stem may be operated to lower the extractor into a pipe section 7 to be extracted, the sleeve is designed to be of slightly less diameter at its larger point than the diameter of the pipe section to be removed. After lowering the extractor into the pipe section, sand and gravel is allowed to enter the drill stem which is hollow, so that such material may pass through the openings or passages 8ª and fill up the space between the wall of the pipe section and the sleeve 8, as is shown in the sectional view, making a secure binding grip with the wall of the sleeve, and then by a lifting action by any suitable means upon the drill stem 1 the sand and gravel gripping against the wall of the pipe section 7, the pipe section may be extracted.

The invention having been set forth, what is claimed is:

1. A pipe section extractor comprising a drill stem and a rod to be lowered into a pipe section to be extracted, said rod having a head, means coupling the head and the lower end of the drill stem, a frustro conical sleeve loosely supported upon the rod, the frustro conical shape extending upwardly with means forming a gripping action between the sleeve and a wall of the pipe section, and means of communication between the drill stem and the interior of the pipe section, whereby the gripping means may enter the pipe section to create its gripping action.

2. In a pipe section extractor, the combination with a rod to be lowered into a pipe section to be extracted, of a frustro conical sleeve operatively supported on the lower end of the rod and loosely fitting the same, said rod having a head at its upper end, a drill stem with means coupling the latter to the head, and means permitting sand and gravel to pass through the head to create a gripping action between the wall of the pipe section and the sleeve, whereby upon an upward movement of the drill stem the pipe section may be extracted.

3. In a pipe extractor, the combination with a rod having a head at one end and a steel point at its opposite end, of a frustro conical member loosely and operatively supported upon the rod, its normal position being adjacent the steel point, a drill stem operatively connected to the rod, and means for permitting sand and gravel to pass through the head and wedge between the member and the wall of a pipe whereby the latter may be extracted.

4. In a pipe extractor, the combination with a rod having a head at one end, of a steel point with means operatively connecting it with the lower end of the rod, a sleeve of conical formation loosely supported upon the rod and resting adjacent the steel point, a coupling sleeve connected to the head, a drill stem connected to the coupling sleeve, said head having passages therein to permit sand and gravel to enter a pipe and create a wedging binding action between the wall of a pipe and the member, whereby upon upward movement of the drill a pipe may be extracted.

In testimony whereof he affixes his signature.

ARNOLD J. SCHULTZ.